(12) United States Patent
Miyoshi et al.

(10) Patent No.: US 9,346,324 B2
(45) Date of Patent: May 24, 2016

(54) PNEUMATIC TIRE (71) Applicant: The Yokohama Rubber Co., LTD., Minato-ku, Tokyo (JP)

(72) Inventors: Masaaki Miyoshi, Hiratsuka (JP); Isamu Kishizoe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 571 days.

(21) Appl. No.: 13/787,657

(22) Filed: Mar. 6, 2013

(65) Prior Publication Data
US 2013/0240100 A1    Sep. 19, 2013

(30) Foreign Application Priority Data

Mar. 14, 2012    (JP) ................................ 2012-057734

(51) Int. Cl.
B60C 11/03 (2006.01)
B60C 11/12 (2006.01)
B60C 11/11 (2006.01)

(52) U.S. Cl.
CPC ......... B60C 11/0318 (2013.04); B60C 11/0304 (2013.04); B60C 11/11 (2013.01); B60C 11/1218 (2013.04); B60C 11/1236 (2013.04); B60C 2011/0374 (2013.04); B60C 2011/0376 (2013.04); B60C 2011/129 (2013.04); B60C 2011/1209 (2013.04); B60C 2011/1213 (2013.04); B60C 2011/1295 (2013.04)

(58) Field of Classification Search
CPC .... B60C 11/03; B60C 11/12; B60C 11/0304; B60C 11/0306; B60C 11/0309; B60C 11/0311; B60C 11/0318; B60C 11/11; B60C 2011/1204; B60C 2011/1209; B60C 2011/1213; B60C 11/1218; B60C 11/1222; B60C 2011/1227; B60C 11/1236; B60C 2011/129; B60C 2011/1295

USPC .......... 152/209.1, 209.2, 209.3, 209.8, 209.9, 152/209.12, 209.13, 209.16, 209.18, 209.25
See application file for complete search history.

(56) References Cited

U.S. PATENT DOCUMENTS

| | | | | |
|---|---|---|---|---|
| 5,660,651 A | * | 8/1997 | Diensthuber | ....... B60C 11/0304 152/209.18 |
| 2010/0224297 A1 | * | 9/2010 | Kiwaki | ................... B60C 11/11 152/209.23 |
| 2013/0118663 A1 | * | 5/2013 | Kishizoe | ................. B60C 11/12 152/209.18 |
| 2013/0146192 A1 | * | 6/2013 | Miyoshi | ............. B60C 11/1315 152/209.25 |

FOREIGN PATENT DOCUMENTS

| | | |
|---|---|---|
| CN | 200939809 | 8/2007 |
| JP | 07-257114 | 10/1995 |

(Continued)

OTHER PUBLICATIONS

Russian Decision on Grant Patent for Invention dated Jan. 22, 2014, 10 pages, Russia.

*Primary Examiner* — Eric Hug
(74) *Attorney, Agent, or Firm* — Thorpe North & Western (57) ABSTRACT

A pneumatic tire having a tread portion, side wall portions, and bead portions includes at least one row of blocks constituted by a plurality of blocks aligned in a tire circumferential direction formed in a vehicle inner side region and a vehicle outer side region of the tread portion. Sipes extend in a tire width direction in each of the blocks. A pitch count of the blocks constituting the row of blocks in the vehicle inner side region is greater than the pitch count of the blocks constituting the row of blocks in the vehicle outer side region. Sipes formed in the blocks in the vehicle outer side region are provided with a structure extending in a linear manner along the depth direction thereof and sipes formed in the blocks in the vehicle inner side region are provided with a structure extending while curving along the depth direction thereof.

16 Claims, 3 Drawing Sheets

FOREIGN PATENT DOCUMENTS

| | | |
|---|---|---|
| JP | 2000-280712 | 10/2000 |
| JP | 2009-274669 | 11/2009 |
| JP | 2010-006108 | 1/2010 |
| JP | 2011-255685 | 1/2010 |
| JP | 2010-006108 | 11/2010 |
| JP | 2010-254155 | 11/2010 |
| JP | 2010-254155 | 12/2011 |
| JP | 2011-255685 | 12/2011 |

\* cited by examiner

PNEUMATIC TIRE

PRIORITY CLAIM

Priority is claimed to Japan Patent Application Serial No. 2012-057734 filed on Mar. 14, 2012.

BACKGROUND

1. Technical Field

The present technology relates to a pneumatic tire provided with a row of blocks constituted by a plurality of blocks aligned in a tire circumferential direction on a tread portion and provided with a plurality of sipes on each block, and more specifically relates to a pneumatic tire whereby both running performance on dry road surfaces and running performance on snow can be achieved at a high dimension.

2. Related Art

In pneumatic tires for winter, such as studless tires, a plurality of circumferential grooves that extend in the tire circumferential direction and a plurality of lug grooves that extend in a tire width direction are formed in the tread portion, a plurality of blocks is partitioned by these circumferential grooves and lug grooves, and a plurality of sipes extending in the tire width direction is formed in each block (see Japanese Unexamined Patent Application Publication No. H7-257114A, Japanese Unexamined Patent Application Publication No. 2000-280712A and Japanese Unexamined Patent Application Publication No. 2009-274669A).

In this type of pneumatic tire, increasing the number of lug grooves and sipes extending in the tire width direction increases the snow traction and enables the running performance on snow to be improved. However, there is the problem that excessive lug grooves and sipes cause decrease in running performance on dry road surfaces due to a decrease in block rigidity.

Particularly, in recent years, for the running performance on dry road surfaces, while there is a demand to increase steering stability including high-speed lane changeability in a high-speed environment such as that exceeding 200 km/h, there is a demand to further improve the running performance on snow, but currently this cannot be accommodated with conventional tread structure.

SUMMARY

The present technology provides a pneumatic tire whereby both running performance on dry road surfaces and running performance on snow can be achieved at a high dimension. A pneumatic tire according to the present technology where a mounting direction of the tire inside and outside is designated when the tire is mounted on a vehicle includes a tread portion forming an annular shape extending in a tire circumferential direction, a pair of side wall portions disposed on both sides of the tread portion, and a pair of bead portions disposed on an inner side in a tire radial direction of the side wall portions. In such a pneumatic tire, at least one row of blocks constituted by a plurality of blocks aligned in the tire circumferential direction respectively in a vehicle inner side region and a vehicle outer side region of the tread portion is formed; a plurality of sipes extending in a tire width direction is formed in each of the blocks; a pitch count of the blocks constituting the row of blocks in the vehicle inner side region is greater than a pitch count of the blocks constituting the row of blocks in the vehicle outer side region; and while the sipes formed in the blocks in the vehicle outer side region are provided with a structure extending in a linear manner along a depth direction thereof, the sipes formed in the blocks in the vehicle inner side region are provided with a structure extending while curving along the depth direction thereof.

In the present technology, providing a greater pitch count of the blocks constituting a row of blocks in the vehicle inner side region of a tread portion than a pitch count of the blocks constituting a row of blocks in the vehicle outer side region improves running performance on snow based on a tread structure of the vehicle inner side region and also improves running performance on dry road surfaces that includes a high-speed lane changeability based on a tread structure of the vehicle outer side region.

Here, excessively reducing block rigidity of the vehicle inner side region due to increasing the pitch count of the blocks constituting the row of blocks in the vehicle inner side region no longer allows sufficient demonstration of running performance on dry road surfaces that was improved as described above. However, adopting a structure where sipes formed in the blocks in the vehicle outer side region extend in a linear manner along the depth direction thereof, while also adopting a structure where sipes formed in the blocks in the vehicle inner side region extend while curving along the depth direction thereof suppresses decrease in block rigidity of the vehicle inner side region to thereby demonstrate the maximum running performance on dry road surfaces. As a result, both running performance on dry road surfaces and running performance on snow can be achieved at a high dimension.

In the present technology, in order to achieve both the running performance on dry road surfaces and the running performance on snow at a high dimension, adoption of the structure given below is preferred. In other words, the pitch count of the blocks constituting the row of blocks in the vehicle outer side region is preferably from 54 to 72, and the pitch count of the blocks constituting the row of blocks in the vehicle inner side region is preferably from 72 to 115, and a difference between the pitch counts in the vehicle inner side region and the vehicle outer side region is preferably from 13 to 43. A sipe density of the blocks in the vehicle inner side region is preferably from 1.2 to 2.0 times the sipe density of the blocks in the vehicle outer side region. A boundary between the vehicle inner side region and the vehicle outer side region is preferably set to a position of from 30% to 60% of a ground contact width from a ground contact edge on the vehicle inner side. A groove width of a lug groove that partitions blocks of a shoulder in the vehicle inner side region is preferably greater than a groove width of a lug groove that partitions blocks of a shoulder in the vehicle outer side region, and a difference in the groove widths thereof is preferably from 0.5 mm to 2.0 mm. A groove depth of a lug groove that partitions blocks of a shoulder in the vehicle inner side region is preferably greater than a groove depth of a lug groove that partitions blocks of a shoulder in the vehicle outer side region, and a difference in the groove depths thereof is preferably from 1.0 mm to 3.0 mm.

In addition, in order to sufficiently secure running performance on snow, a snow traction index STI expressed by the following expression (1) is preferably not less than 180:

$$STI = -6.8 + 2202\, \rho g + 672\, \rho s + 7.6\, Dg \tag{1}$$

According to expression (1), $\rho g$ is a groove density (mm/mm$^2$) equal to a total length (mm) of an extending component in the tire width direction of the groove/a total area (mm$^2$) of a ground contact region. $\rho s$ is a sipe density (mm/mm$^2$) equal to a total length (mm) of an extending component in the tire width direction of the sipe/a total area (mm$^2$) of the ground contact region. Dg is an average groove depth (mm).

In the present technology, the vehicle inner side region and the vehicle outer side region of the tread portion are regions that are partitioned within the ground contact region of the tread portion. The ground contact region is a region on the tire circumference defined by the ground contact width. The ground contact width is a maximum linear distance in a tire axial direction for a contact surface with a flat surface when a regular load is applied to a tire assembled on a regular rim and is inflated to a regular inner pressure and the tire is placed at a position perpendicular to the flat surface. "Regular rim" is a rim defined by a standard for each tire according to a standards body that includes standards on which tires are based, for example, JATMA (Japan Automobile Tyre Manufacturers Association) is for a standard rim, TRA (Tire and Rim Association) is for a "design rim", and ETRTO (European Tyre and Rim Technical Organisation) is for a "measuring rim". "Regular inner pressure" is an air pressure defined by standards for each tire according to a standards body that includes standards on which tires are based, for example, JATMA is for maximum air pressure, TRA is a list of maximum values in the table of "TIRE ROAD LIMITS AT VARIOUS COLD INFLATION PRESSURES", and ETRTO is for "INFLATION PRESSURE" and is 180 kPa for a tire on a passenger vehicle. "Regular load" is the load defined by standards for each tire according to a standards body that includes standards on which tires are based, for example, JATMA is for maximum load capacity, TRA is a list of maximum values in the table of "TIRE ROAD LIMITS AT VARIOUS COLD INFLATION PRESSURES", and ETRTO is for "LOAD CAPACITY" and is a load that corresponds to 88% of the load for a tire on a passenger vehicle.

BRIEF DESCRIPTION OF THE DRAWINGS

FIG. 3 illustrates a representative block combination on the pneumatic tire of the present technology.

FIG. 4 illustrates another block combination on the pneumatic tire of the present technology.

DETAILED DESCRIPTION

Figure 1:
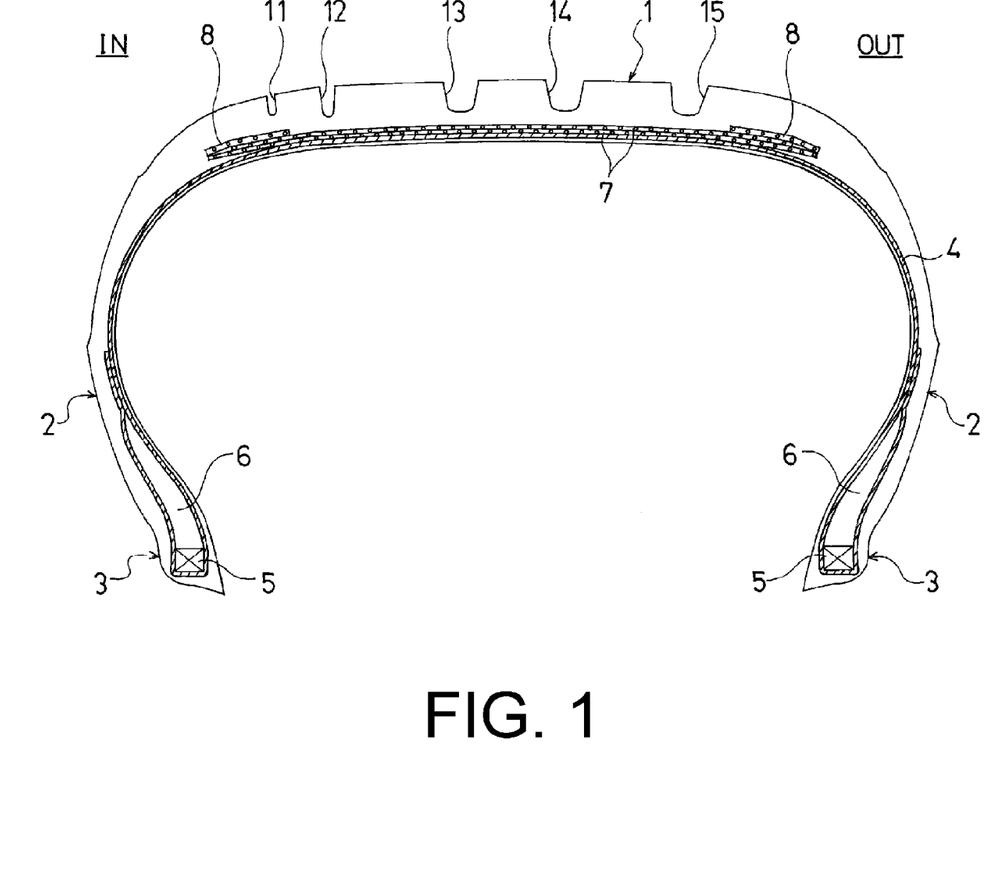
FIG. 1 is a meridian cross-sectional view illustrating a pneumatic tire according to an embodiment of the present technology.
Figure 2:
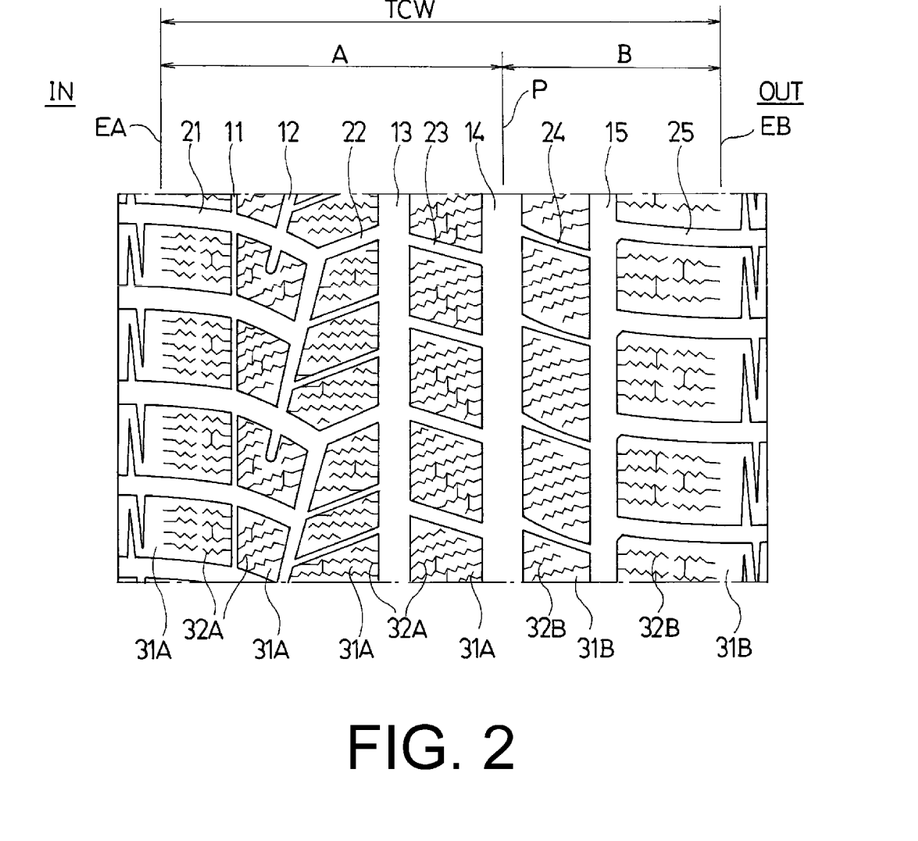
FIG. 2 is a development view illustrating a tread pattern of the pneumatic tire according to the embodiment of the present technology.

Detailed descriptions will be given below of a configuration of the present technology with reference to the accompanying drawings. FIGS. 1 and 2 illustrate a pneumatic tire according to an embodiment of the present technology. The pneumatic tire is a tire having a designated tire front/back mounting direction when mounted on a vehicle. In FIGS. 1 and 2, "IN" refers to a vehicle inner side of the pneumatic tire when mounted on a vehicle and "OUT" refers to a vehicle outer side when mounted on a vehicle.

As illustrated in FIG. 1, the pneumatic tire of this embodiment is provided with a tread portion 1 extending in a tire circumferential direction to form an annular shape, a pair of side wall portions 2 that is disposed on both sides of the tread portion 1, and a pair of bead portions 3 that is disposed on the inner side in a tire radial direction of the side wall portions 2.

A carcass layer 4 is mounted between the pair of bead portions 3,3. The carcass layer 4 includes a plurality of reinforcing cords extending in the tire radial direction, and is folded back around a bead core 5 disposed in each of the bead portions 3 from the tire inner side to the tire outer side. Generally, organic fiber cords are used as the reinforcing cords of the carcass layer 4, but steel cords may be used. A bead filler 6 having a triangular cross-sectional shape formed from rubber composition is disposed on a periphery of the bead core 5.

Meanwhile, a plurality of layers of a belt layer 7 is embedded on an outer circumferential side of the carcass layer 4 in the tread portion 1. These belt layers 7 include a plurality of reinforcing cords that incline with respect to the tire circumferential direction and the reinforcing cords are disposed between the layers so as to intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of enhancing high-speed durability, at least one layer of a belt cover layer 8 formed by arranging reinforcing cords at an angle of not more than 5° with respect to the tire circumferential direction, is disposed on an outer circumferential side of the belt layers 7. The belt cover layer 8 preferably has a jointless structure in which a strip material made from at least a single reinforcing cord laid in parallel and covered with rubber is wound continuously in the tire circumferential direction. Also, the belt cover layer 8 can be disposed so as to cover the belt layer 7 in the width direction at all positions, or can be disposed to cover only the edge portions of the belt layer 7 on the outer side in the width direction. Nylon, aramid, or similar organic fiber cords are preferably used as the reinforcing cords of the belt cover layer 8.

Note that the tire internal structure described above is exemplary of a pneumatic tire, but is not limited thereto.

As illustrated in FIG. 2, in the tread portion 1, one circumferential narrow groove 11 that extends in a straight shape in the tire circumferential direction, a plurality of circumferential angled grooves 12 that extend in the tire circumferential direction while at an angle with respect to the tire circumferential direction, three circumferential main grooves 13, 14, and 15 that extend in a straight shape in the tire circumferential direction, a plurality of lug grooves 21 that extend in the tire width direction so as to connect a design end of the vehicle inner side (IN) to the circumferential angled grooves 12, a plurality of lug grooves 22 that extend in the tire width direction so as to connect the circumferential angled grooves 12 to the circumferential main groove 13, a plurality of lug grooves 23 that extend in the tire width direction so as to connect the circumferential main groove 13 to the circumferential main groove 14, a plurality of lug grooves 24 that extend in the tire width direction so as to connect the circumferential main groove 14 to the circumferential main groove 15, and a plurality of lug grooves 25 that extend in the tire width direction so as to connect the design end of the vehicle outer side (OUT) to the circumferential main groove 15 are formed.

The grooves 11 to 15 and the grooves 21 to 25 partition multiple blocks 31A in a vehicle inner side region A of the tread portion 1 and partition multiple blocks 31B in a vehicle outer side region B of the tread portion 1. More specifically, four rows of blocks constituted by the plurality of blocks 31A are formed aligned in the tire circumferential direction in the vehicle inner side region A, and the plurality of blocks 31B are formed aligned in the tire circumferential direction in the vehicle outer side region B. Further, a plurality of sipes 32A extending in the tire width direction is formed in each of the blocks 31A, and a plurality of sipes 32B extending in the tire width direction is formed in each of the blocks 31B.

In the pneumatic tire described above, a pitch count of the blocks 31A constituting the row of blocks in the vehicle inner side region A is greater than a pitch count of the blocks 31B constituting the row of blocks in the vehicle outer side region B. In other words, the arrangement density of the lug grooves 21 to 23 that partition the blocks 31A in the vehicle inner side region A is relatively higher in comparison to the arrangement density of the lug grooves 24 to 25 that partition the blocks 31B in the vehicle outer side region B. Therefore, the running performance on snow can be improved based on the tread structure of the vehicle inner side region A, and the running performance on dry road surfaces, including high-speed lane changeability, can be improved based on the tread structure of the vehicle outer side region B.

Here, a pitch count PB on the tire circumference of the blocks 31B constituting the row of blocks in the vehicle outer side region B may be set within ranges from 54 to 72, and a pitch count PA on the tire circumference of the blocks 31A constituting the row of blocks in the vehicle inner side region A may be set within ranges from 72 to 115, and a difference $\Delta P$ of the pitch counts between the vehicle inner side region A and the vehicle outer side region B ($\Delta P = PA - PB$) may be set within ranges from 13 to 43. By this, both the running performance on dry road surfaces and the running performance on snow can be achieved at a high dimension. When the pitch count PA of the blocks 31A in the vehicle inner side region A is below 72, the improved effect for the running performance on snow is reduced, and conversely, when it exceeds 115, the improved effect for the running performance on dry road surfaces is reduced. When the pitch count PB of the blocks 31B in the vehicle outer side region B is below 54, the improved effect for the running performance on snow is reduced, and conversely, when it exceeds 72, the improved effect for the running performance on dry road surfaces is reduced. When the difference $\Delta P$ of the pitch counts is below 13, the effect for achieving both performances at a high dimension becomes insufficient, and conversely, when it exceeds 43, the performance of either one is reduced.

In the pneumatic tire described above, sipes 32B formed in the blocks 31B in the vehicle outer side region B have a structure extending in a linear manner along the depth direction thereof, and sipes 32A formed in the blocks 31A in the vehicle inner side region A have a structure extending while curving along the depth direction thereof.

Figure 3A:
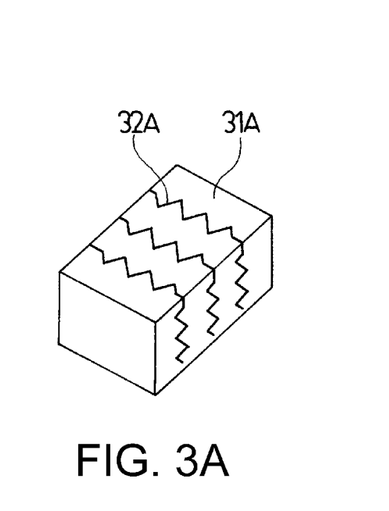
FIG. 3A is a perspective view illustrating a block in a vehicle inner side region.
Figure 3B:
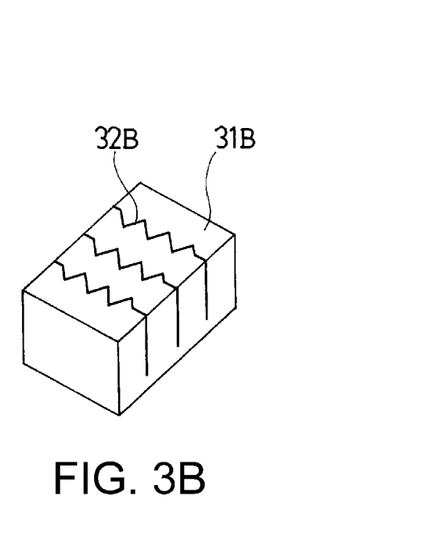
FIG. 3B is a perspective view illustrating a block in a vehicle outer side region.

FIG. 3 illustrates a representative block combination on the pneumatic tire of the present technology. In FIG. 3A, the sipes 32A formed in the block 31A in the vehicle inner side region A have a structure that extends in a zigzag shape or a wave shape while curving along the length direction thereof, and extends in a zigzag shape or a wave shape while curving along the depth direction thereof. The block 31A having this type of structure has a relatively high rigidity against external forces in the tire circumferential direction and is less likely to collapse to the tire circumferential direction. Meanwhile, in FIG. 3B, the sipes 32B formed in the block 31B in the vehicle outer side region B have a structure extending in a zigzag shape or a wave shape while curving along the length direction thereof, and extending in a linear manner along the depth direction thereof. The block 31B having this type of structure has a low rigidity against external forces in the tire circumferential direction compared to the block 31A.

As described above, adopting a structure where the sipes 32B formed in the block 31B in the vehicle outer side region B extend in a linear manner in the depth direction thereof, while also adopting a structure where the sipes 32A formed in the block 31A in the vehicle inner side region extend while curving along the depth direction thereof suppresses reduction of block rigidity in the vehicle inner side region A to thereby demonstrate the maximum improved running performance on dry road surfaces as described above. As a result, both the running performance on dry road surfaces and the running performance on snow can be achieved at a high dimension.

Figure 4A:
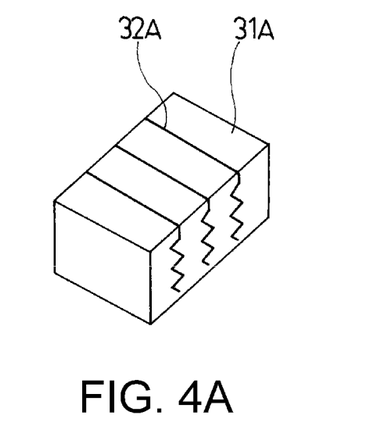
FIG. 4A is a perspective view illustrating a block in the vehicle inner side region.
Figure 4B:
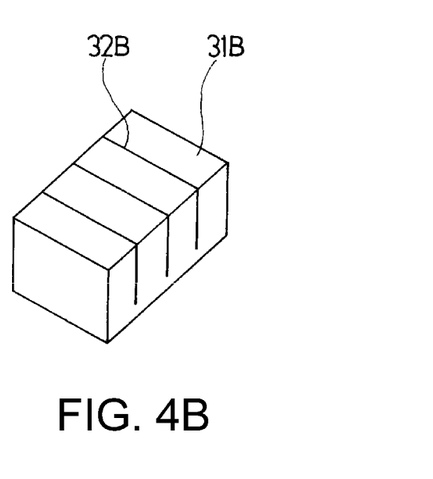
FIG. 4B is a perspective view illustrating a block in the vehicle outer side region.

FIG. 4 illustrates another block combination on the pneumatic tire of the present technology. In FIG. 4A, the sipes 32A formed in the block 31A in the vehicle inner side region A have a structure extending in a linear manner along the length direction thereof, and extending in a zigzag shape or a wave shape while curving along the depth direction thereof. The block 31A having this type of structure has a relatively high rigidity against external forces in the tire circumferential direction and is less likely to collapse to the tire circumferential direction. Meanwhile, in FIG. 4B, the sipes 32B formed in the block 31B in the vehicle outer side region B have a structure extending in a linear manner along the length direction thereof, and extending in a linear manner along the depth direction thereof.

The block 31B having this type of structure has a low rigidity against external forces in the tire circumferential direction compared to the block 31A.

The combination of the block 31A in the vehicle inner side region A illustrated in FIG. 4A and the block 31B in the vehicle outer side region B illustrated in FIG. 4B also suppresses reduction of block rigidity in the vehicle inner side region A to thereby demonstrate the maximum running performance on dry road surfaces. As a result, both the running performance on dry road surfaces and running performance on snow can be achieved at a high dimension.

In the pneumatic tire described above, the sipe density of the block 31A in the vehicle inner side region A is preferably 1.2 to 2.0 times the sipe density of the block 31B in the vehicle outer side region B. The sipe density of the block 31A in the vehicle inner side region A is a ratio (%) of the total length of the extended portion in the tire width direction of the sipe 32A relative to the total area of the block 31A included in the vehicle inner side region A. Similarly, the sipe density of the block 31B in the vehicle outer side region B is a ratio (%) of the total length of the extended portion in the tire width direction of the sipe 32B relative to the total area of the block 31B included in the vehicle outer side region B. Relatively increasing the sipe density in the vehicle inner side region A improves the running performance on snow. However, increasing the sipe density in the vehicle inner side region A too much worsens the running performance on dry road surfaces.

In the pneumatic tire described above, a ground contact width TCW is stipulated between a ground contact edge EA on the vehicle inner side and a ground contact edge EB on the vehicle outer side, and the boundary between the vehicle inner side region A and the vehicle outer side region B is preferably set to a position P from 30% to 60% of the ground contact width TCW from the ground contact edge EA on the vehicle inner side. Partitioning the vehicle inner side region A and the vehicle outer side region B by the position P given above enables both the running performance on dry road surfaces and the running performance on snow to be achieved at a high dimension. When the width of the vehicle inner side region A is below 30% of the ground contact width TCW, the improved effect of the running performance on snow becomes insufficient, and conversely, when it exceeds 60%, the improved effect of the running performance on dry road surfaces becomes insufficient.

The groove width of the lug groove 21 that partitions the block 31A of the shoulder in the vehicle inner side region A is preferably greater than the groove width of the lug groove 25 that partitions the block 32B of the shoulder in the vehicle outer side region B, and the difference in the groove widths thereof is preferably from 0.5 mm to 2.0 mm. By this, both the running performance on dry road surfaces and the running performance on snow can be achieved at a high dimension. If the lug groove 21 in the vehicle inner side region A is narrower than the regulation given above, the improved effect of the running performance on snow becomes insufficient, and conversely, when it is wider than the regulation given above, the improved effect of the running performance on dry road surfaces becomes insufficient.

The groove depth of the lug groove 21 that partitions the block 31A of the shoulder in the vehicle inner side region A is preferably greater than the groove depth of the lug groove 25 that partitions the block 32B of the shoulder in the vehicle outer side region B, and the difference in the groove depths thereof is preferably from 1.0 mm to 3.0 mm. By this, both the running performance on dry road surfaces and the running performance on snow can be achieved at a high dimension. If the lug groove 21 in the vehicle inner side region A is shallower than the regulation given above, the improved effect of the running performance on snow becomes insufficient, and conversely, when it is deeper than the regulation given above, the improved effect of the running performance on dry road surfaces becomes insufficient.

In addition, in the pneumatic tire described above, in order to sufficiently secure running performance on snow, a snow traction index STI expressed by the following expression (1) is preferably not less than 180. When the snow traction index STI is below 180, it becomes difficult for favorable performance as a winter tire to be demonstrated.

$$STI = -6.8 + 2202\,\rho g + 672\,\rho s + 7.6\,Dg \quad (1)$$

According to expression (1), $\rho g$ represents a groove density (mm/mm$^2$) equal to a total length (mm) of an extending component in the tire width direction of the groove/a total area (mm$^2$) of a ground contact region;

According to expression (1), $\rho s$ represents a sipe density (mm/mm$^2$) equal to a total length (mm) of an extending component in the tire width direction of the sipe/a total area (mm$^2$) of the ground contact region According to expression (1), Dg represents an average groove depth (mm).

Note that the groove used in the calculation of the groove density $\rho g$ is not less than 1.6 mm in width and not less than 4 mm in depth. Meanwhile, the sipe used to calculate the sipe density $\rho s$ is less than 1.6 mm in width and not less than 4 mm in depth. In addition, the total area of the ground contact region is the product of the ground contact width TCW and the tire circumference length.

EXAMPLES

Pneumatic tires having a tire size of 245/40R18 where a mounting direction of the tire inside and outside is designated at the time of mounting were produced for a Conventional Example, Comparative Example 1, and Working Examples 1 to 8 where, a plurality of rows of blocks constituted by a plurality of blocks is formed aligned in the tire circumferential direction respectively in the vehicle inner side region and in the vehicle outer side region of the tread portion, a plurality of sipes that extends in the tire width direction is formed in each block, a pitch count of the block constituting the row of blocks in the vehicle inner side region, a pitch count of the block constituting the row of blocks in the vehicle outer side region, a sipe structure formed in the blocks in the vehicle inner side region, a sipe structure formed in the blocks in the vehicle outer side region, a ratio of the sipe density (sipe density ratio) in the blocks in the vehicle inner side region relative to the sipe density in the blocks in the vehicle outer side region, a ratio of the vehicle inner side region relative to the ground contact width (inner side region ratio (%)), a groove width of a shoulder lug groove in the vehicle inner side region, a groove width of the shoulder lug groove in the vehicle outer side region, a groove depth of the shoulder lug groove in the vehicle inner side region, and a groove depth of the shoulder lug groove in the vehicle outer side region, are set up as shown in Table 1.

These test tires were evaluated according to the following evaluation methods for steering stability on dry road surfaces and steering stability on snow, and the results thereof are also shown in Table 1.

Steering Stability on Dry Road Surfaces:

The test tires were assembled on wheels having a rim size of 18×81/2 J, mounted on a test vehicle having a 2000 cc displacement, and under conditions of 230 kPa air pressure, a sensory evaluation was performed by a test driver for steering stability (high-speed lane changeability in a speed range up to 240 km/h) on dry road surfaces. The evaluation results were expressed as an index with the Conventional Example being 100. A larger index value indicates superior steering stability on dry road surfaces.

Steering Stability on Snow:

The test tires were assembled on wheels having a rim size of 18×81/2 J, mounted on a test vehicle having a 2000 cc displacement, and under conditions of 230 kPa air pressure, a sensory evaluation was performed by a test driver for steering stability on snow. The evaluation results were expressed as an index with the Conventional Example being 100. A larger index value indicates superior steering stability on snow.

TABLE 1

|  |  | Conventional Example | Comparative Example 1 | Working Example 1 | Working Example 2 | Working Example 3 |
|---|---|---|---|---|---|---|
| Pitch count of block | INNER SIDE REGION | 68 | 100 | 76 | 100 | 100 |
|  | OUTER SIDE REGION | 64 | 72 | 64 | 72 | 72 |
| Sipe form | INNER SIDE REGION | FIG. 3B | FIG. 3B | FIG. 3A | FIG. 3A | FIG. 3A |

TABLE 1-continued

|  |  | FIG. 3B | FIG. 3B | FIG. 3B | FIG. 3B | FIG. 3B |
|---|---|---|---|---|---|---|
|  | OUTER SIDE REGION |  |  |  |  |  |
| Sipe density ratio |  | 1 | 1 | 1 | 1 | 1.5 |
| Inner side region ratio (%) |  | 50 | 50 | 50 | 50 | 50 |
| Groove width (mm) of shoulder lug groove | INNER SIDE REGION | 8.0 | 8.0 | 8.0 | 8.0 | 8.0 |
|  | OUTER SIDE REGION | 8.0 | 8.0 | 8.0 | 8.0 | 8.0 |
| Groove depth (mm) of shoulder lug groove | INNER SIDE REGION | 8.5 | 8.5 | 8.5 | 8.5 | 8.5 |
|  | OUTER SIDE REGION | 8.5 | 8.5 | 8.5 | 8.5 | 8.5 |
| Steering stability on dry road surface |  | 100 | 95 | 102 | 100 | 100 |
| Steering stability on snow |  | 100 | 105 | 103 | 106 | 108 |

|  |  | Working Example 4 | Working Example 5 | Working Example 6 | Working Example 7 | Working Example 8 |
|---|---|---|---|---|---|---|
| Pitch count of block | INNER SIDE REGION | 100 | 100 | 100 | 100 | 100 |
|  | OUTER SIDE REGION | 72 | 72 | 72 | 72 | 72 |
| Sipe form | INNER SIDE REGION | FIG. 3A | FIG. 3A | FIG. 3A | FIG. 3A | FIG. 3A |
|  | OUTER SIDE REGION | FIG. 3B | FIG. 3B | FIG. 3B | FIG. 3B | FIG. 3B |
| Sipe density ratio |  | 3 | 1.5 | 1.5 | 1.5 | 2 |
| Inner side region ratio (%) |  | 50 | 65 | 50 | 50 | 50 |
| Groove width (mm) of shoulder lug groove | INNER SIDE REGION | 8.0 | 8.0 | 9.0 | 9.0 | 9.0 |
|  | OUTER SIDE REGION | 8.0 | 8.0 | 7.0 | 7.0 | 5.0 |
| Groove depth (mm) of shoulder lug groove | INNER SIDE REGION | 8.5 | 8.5 | 8.5 | 8.5 | 8.5 |
|  | OUTER SIDE REGION | 8.5 | 8.5 | 8.5 | 7.5 | 6.5 |
| Steering stability on dry road surface |  | 99 | 99 | 102 | 104 | 106 |
| Steering stability on snow |  | 110 | 110 | 110 | 110 | 102 |

As can be seen from Table 1, the tires according to Working Examples 1 to 8 had high dimension compatibility in steering stability on dry road surfaces and steering stability on snow, compared with the Conventional Example. Meanwhile, compared with the Conventional Example, an improved effect in steering stability on snow was found in the tires according to Comparative Example 1 due to the increase in the pitch count in the blocks constituting the row of blocks, and in conjunction with this, steering stability on dry road surfaces worsened.

What is claimed is:

1. A pneumatic tire where a mounting direction of the tire inside and outside is designated when the tire is mounted on a vehicle, comprising a tread portion forming an annular shape extending in a tire circumferential direction, a pair of side wall portions disposed on both sides of the tread portion, and a pair of bead portions disposed on an inner side in the tire radial direction of the side wall portions; wherein:

at least one row of blocks constituted by a plurality of blocks aligned in the tire circumferential direction respectively in a vehicle inner side region and a vehicle outer side region of the tread portion is formed;

a plurality of sipes extending in a tire width direction is formed in each of the blocks;

a pitch count of the blocks constituting the row of blocks in the vehicle inner side region is greater than a pitch count of the blocks constituting the row of blocks in the vehicle outer side region;

the sipes formed in the blocks in the vehicle outer side region are provided with a structure extending in a linear manner along a depth direction thereof;

the sipes formed in the blocks in the vehicle inner side region are provided with a structure extending while curving along the depth direction thereof, and a sipe density of the blocks in the vehicle inner side region is from 1.2 to 2.0 times the sipe density of the blocks in the vehicle outer side region.

2. The pneumatic tire according to claim 1, wherein: the pitch count of the blocks constituting the row of blocks in the vehicle outer side region is from 54 to 72, the pitch count of the blocks constituting the row of blocks in the vehicle inner side region is from 72 to 115, and a difference between the pitch counts in the vehicle inner side region and the vehicle outer side region is from 13 to 43.

3. The pneumatic tire according to claim 1, wherein a boundary between the vehicle inner side region and the vehicle outer side region is set to a position of from 30% to 60% of a ground contact width from a ground contact edge on the vehicle inner side.

4. The pneumatic tire according to claim 3, wherein: a groove width of a lug groove that partitions blocks of a shoulder in the vehicle inner side region is greater than a groove width of a lug groove that partitions blocks of a shoulder in the vehicle outer side region, and a difference in the groove widths is from 0.5 mm to 2.0 mm.

5. The pneumatic tire according to claim 4, wherein: a groove depth of the lug groove that partitions the blocks of the shoulder in the vehicle inner side region is greater than a groove depth of the lug groove that partitions the blocks of the shoulder on the vehicle outer side region, and a difference in the groove depths is from 1.0 mm to 3.0 mm.

6. The pneumatic tire according to claim 5, wherein a snow traction index STI expressed by formula (1) below is not less than 180:

$$STI=6.8+2202\ \rho g+672\ \rho s+7.6\ Dg \quad (1)$$

wherein, $\rho g$: groove density (mm/mm$^2$)=a total length (mm) of an extending component in the tire width direction of the groove/a total area (mm$^2$ of a ground contact region);

$\rho s$: sipe density (mm/mm$^2$)=a total length of an extending component in the tire width direction of the sipe (mm)/ total area (mm$^2$) of the ground contact region; and Dg: average groove depth (mm).

7. The pneumatic tire according to claim 1, wherein a boundary between the vehicle inner side region and the vehicle outer side region is set to a position of from 30% to 60% of a ground contact width from a ground contact edge on the vehicle inner side.

8. The pneumatic tire according to claim 1, wherein: a groove width of a lug groove that partitions blocks of a shoulder in the vehicle inner side region is greater than a groove width of a lug groove that partitions blocks of a shoulder in the vehicle outer side region, and a difference in the groove widths is from 0.5 mm to 2.0 mm.

9. The pneumatic tire according to claim 1, wherein: a groove depth of a lug groove that partitions blocks of the shoulder in the vehicle inner side region is greater than a groove depth of a lug groove that partitions blocks of the shoulder on the vehicle outer side region, and a difference in the groove depths is from 1.0 mm to 3.0 mm.

10. The pneumatic tire according to claim 1, wherein a snow traction index STI expressed by formula (1) below is not less than 180:

$$STI=6.8+2202\ \rho g+672\ \rho s+7.6\ Dg \quad (1);$$

wherein, $\rho g$: groove density (mm/mm$^2$)=a total length (mm) of an extending component in the tire width direction of the groove/a total area (mm$^2$ of a ground contact region);

$\rho s$: sipe density (mm/mm$^2$)=a total length of an extending component in the tire width direction of the sipe (mm)/ total area (mm$^2$) of the ground contact region; and Dg: average groove depth (mm).

11. The pneumatic tire according to claim 1, wherein the pitch count of the blocks constituting the row of blocks in the vehicle outer side region is from 54 to 72.

12. The pneumatic tire according to claim 1, wherein the pitch count of the blocks constituting the row of blocks in the vehicle inner side region is from 72 to 115.

13. The pneumatic tire according to claim 1, wherein a difference between the pitch counts in the vehicle inner side region and the vehicle outer side region is from 13 to 43.

14. The pneumatic tire according to claim 1, wherein a groove width of a lug groove that partitions blocks of a shoulder in the vehicle inner side region is greater than a groove width of a lug groove that partitions blocks of a shoulder in the vehicle outer side region.

15. The pneumatic tire according to claim 1, wherein a groove depth of the lug groove that partitions the blocks of the shoulder in the vehicle inner side region is greater than a groove depth of the lug groove that partitions the blocks of the shoulder on the vehicle outer side region.

16. A pneumatic tire where a mounting direction of the tire inside and outside is designated when the tire is mounted on a vehicle, comprising a tread portion forming an annular shape extending in a tire circumferential direction, a pair of side wall portions disposed on both sides of the tread portion, and a pair of bead portions disposed on an inner side in the tire radial direction of the side wall portions; wherein:

at least one row of blocks constituted by a plurality of blocks aligned in the tire circumferential direction respectively in a vehicle inner side region and a vehicle outer side region of the tread portion is formed;

a plurality of sipes extending in a tire width direction is formed in each of the blocks;

a pitch count of the blocks constituting the row of blocks in the vehicle inner side region is greater than a pitch count of the blocks constituting the row of blocks in the vehicle outer side region;

the sipes formed in the blocks in the vehicle outer side region are provided with a structure extending in a linear manner along a depth direction thereof;

the sipes formed in the blocks in the vehicle inner side region are provided with a structure extending while curving along the depth direction thereof, and a groove depth of a lug groove that partitions blocks of a shoulder in the vehicle inner side region is greater than a groove depth of a lug groove that partitions blocks of a shoulder on the vehicle outer side region, and a difference in the groove depths is from 1.0 mm to 3.0 mm.

* * * * *